(12) United States Patent
Bremer

(10) Patent No.: US 6,339,941 B1
(45) Date of Patent: Jan. 22, 2002

(54) DEVICE FOR COOLING GLASS VOLUMES

(75) Inventor: Carsten Bremer, Chalon sur Saone (FR)

(73) Assignee: Saint-Gobain Glass France, Courbevoie (FR)

(*) Notice: Subject to any disclaimer, the term of this patent is extended or adjusted under 35 U.S.C. 154(b) by 0 days.

(21) Appl. No.: 09/308,217

(22) PCT Filed: Sep. 17, 1998

(86) PCT No.: PCT/FR98/01990

§ 371 Date: Aug. 23, 1999

§ 102(e) Date: Aug. 23, 1999

(87) PCT Pub. No.: WO99/15469

PCT Pub. Date: Apr. 1, 1999

(30) Foreign Application Priority Data

Sep. 19, 1997 (FR) .............................................. 97/11717

(51) Int. Cl.$^7$ ............................................ C03B 27/048
(52) U.S. Cl. ...................... 65/355; 65/25.2; 65/25.4; 65/114; 65/182.2; 65/348; 65/351; 425/DIG. 2
(58) Field of Search ................................. 65/25.2, 25.4, 65/114, 182.2, 348, 351, 355; 425/DIG. 2

(56) References Cited

U.S. PATENT DOCUMENTS

| 4,470,838 A | * | 9/1984 | McMaster et al. | ............. 65/348 |
| 4,816,058 A | * | 3/1989 | Kuster et al. | .................. 65/114 |
| 5,045,102 A | * | 9/1991 | Vanaschen et al. | ........... 65/351 |
| 5,917,107 A | * | 6/1999 | Ducat et al. | ................... 65/348 |

FOREIGN PATENT DOCUMENTS

DE          3425809       * 1/1986 ................. 65/348

* cited by examiner

Primary Examiner—Michael Colaianni
(74) Attorney, Agent, or Firm—Oblon, Spivak, McClelland, Maier & Neustadt, P.C.

(57) ABSTRACT

A chest for cooling glass plates. A box is formed from a rigid support having at least a side panel on which are fixed nozzles. Each nozzle is made of two plate flanges and a strap perforated with blow holes. The flanges are made in a single piece having tabs folded in the direction of the neighboring flanges. Elements fixing the flanges mutually and fixing the straps to the flanges are produced by riveting or interposition of a sealant.

21 Claims, 4 Drawing Sheets

DEVICE FOR COOLING GLASS VOLUMES

BACKGROUND OF THE INVENTION

1. Field of the Invention

The invention relates to cooling of glass volume, such as tempering of glass plates having curvature in several directions, especially plates intended for making vehicle windows.

2. Discussion of the Background

It is known that such cooling can be achieved by means of two cooling-gas blowing chests, one lower and the other upper respectively, disposed opposite each other.

Some chests intended for tempering curved plates have a central region, on each side of which there are joined two lateral regions; because of their complexity they are cumbersome, but are capable of tempering plates of diverse geometries in the thickness range greater than about 4 mm.

Nevertheless, because of the present trend toward manufacture of increasingly thin plates with increasingly more complex forms, the differences in distances between chest and plate over the surface thereof have greater consequences, and the impossibility of sufficiently ensuring the ideal plate-to-chest distance over numerous zones of the plate surface results in internal tensions which make the plate susceptible to cracking.

Other chests "dedicated" to the plate to be tempered and to plates of very similar geometry make it possible to temper plates of complex forms, but the chest must be changed whenever the type of plate is changed. Because the chests are used only during a period equal to the "lifetime" of a type of plate, such as a rear window or side window, it is imperative to lower the prime cost thereof, although at the present time it has not been possible to reduce this price sufficiently.

In fact, these present chests are made from parts assembled either by use of threaded fasteners and bonding adhesives or by welding, all manually performed operations requiring considerable labor.

SUMMARY OF THE INVENTION

The object of the invention is to remedy these disadvantages and to provide cooling chests whose prime cost and operating costs are moderate, and which permit great precision in the cooling operation, such as tempering.

This object is achieved according to the invention by a chest for cooling and more particularly for tempering glass plates, provided with nozzles forming a blowing zone, a rigid support associated with at least one panel on which the nozzles are fixed, each nozzle comprising two flanges and a strap perforated with blow holes, and the flanges being of one-piece construction, which is provided with tabs folded toward the neighboring flanges, the fixations of the flanges to each other and of the straps to the flanges being achieved by riveting and/or interposition of a cement.

According to a preferred embodiment of the invention, and for better fixation of the nozzles, the chest is provided with at least one tie rod traversing the assembly of nozzles and the panel.

More preferably, and to minimize the deformation of the flanges, braces are slipped over the tie rod.

In a preferred variant of the invention endowing the structure with even more rigidity, the chest is provided with:

→ a rigid support provided with two panels and two faces connecting these two panels, → an assembly of nozzles disposed in succession from one panel to the other and extending from one face to the other while projecting beyond the support toward the cooling space, each nozzle being provided with two flanges and one strap perforated with blow holes inserted between the flanges along at least one edge segment thereof to comprise the blowing outlet, and fixed to the flanges by riveting, each flange being provided with tabs integral therewith, folded at right angles toward the neighboring flanges, at least some tabs being superposed and fixed together by rivets and interposition of a cement, → tie rods for fixation of the assembly of nozzles to the support, traversing this assembly and the panels, and braces slipped thereover and provided between the neighboring flanges belonging to two neighboring nozzles with a surface which limits the deformation of the flanges.

By virtue of the structure that it was possible to adopt as a result of the riveting and adhesive bonding assembly process, and in particular the speed of the folding operations, the weight improvement and the reduction of the number of welds and components, the object mentioned hereinabove was successfully achieved without compromising the quality level of the product obtained by means of the device according to the invention.

BRIEF DESCRIPTION OF THE DRAWINGS

Other characteristics and advantages of this invention will become clear from the dependent claims and from the description hereinafter of an embodiment thereof, given by way of non-limitative example and illustrated by the attached drawings, wherein:

DETAILED DESCRIPTION OF THE PREFERRED EMBODIMENTS

Figure 1:
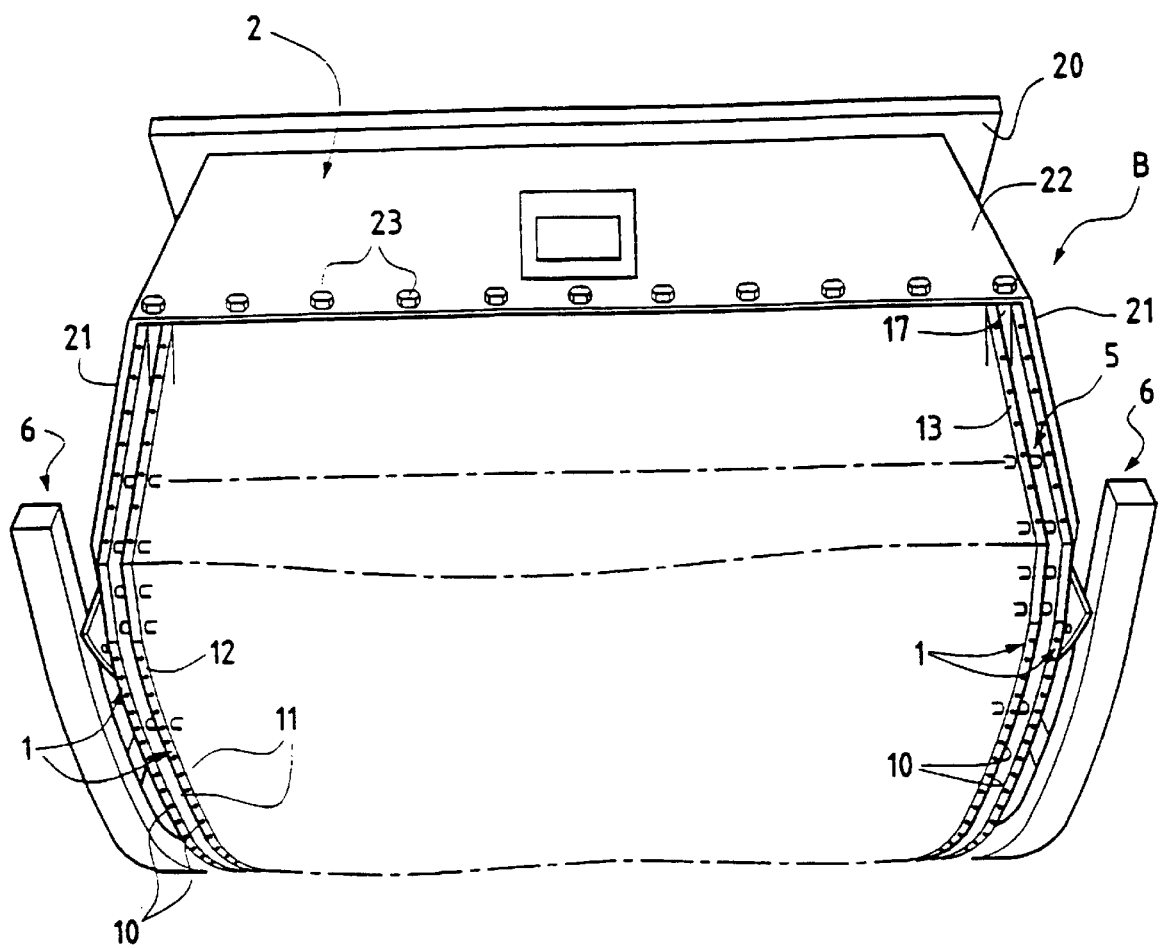
FIGS. 1 and 2 are partial perspective views of respectively the upper and lower elements comprising a device according to the invention, ☐
Figure 2:
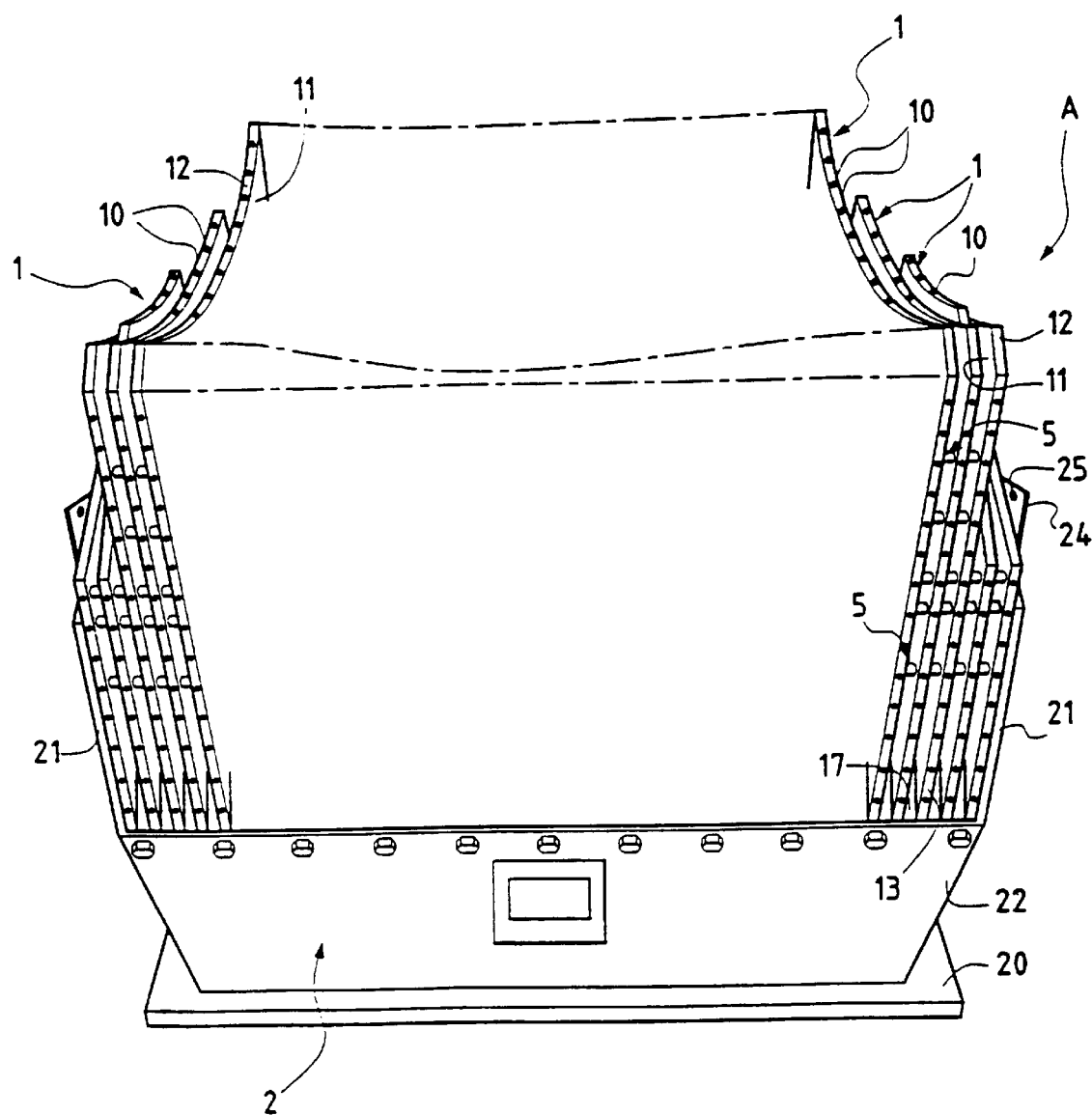
Figure 3:
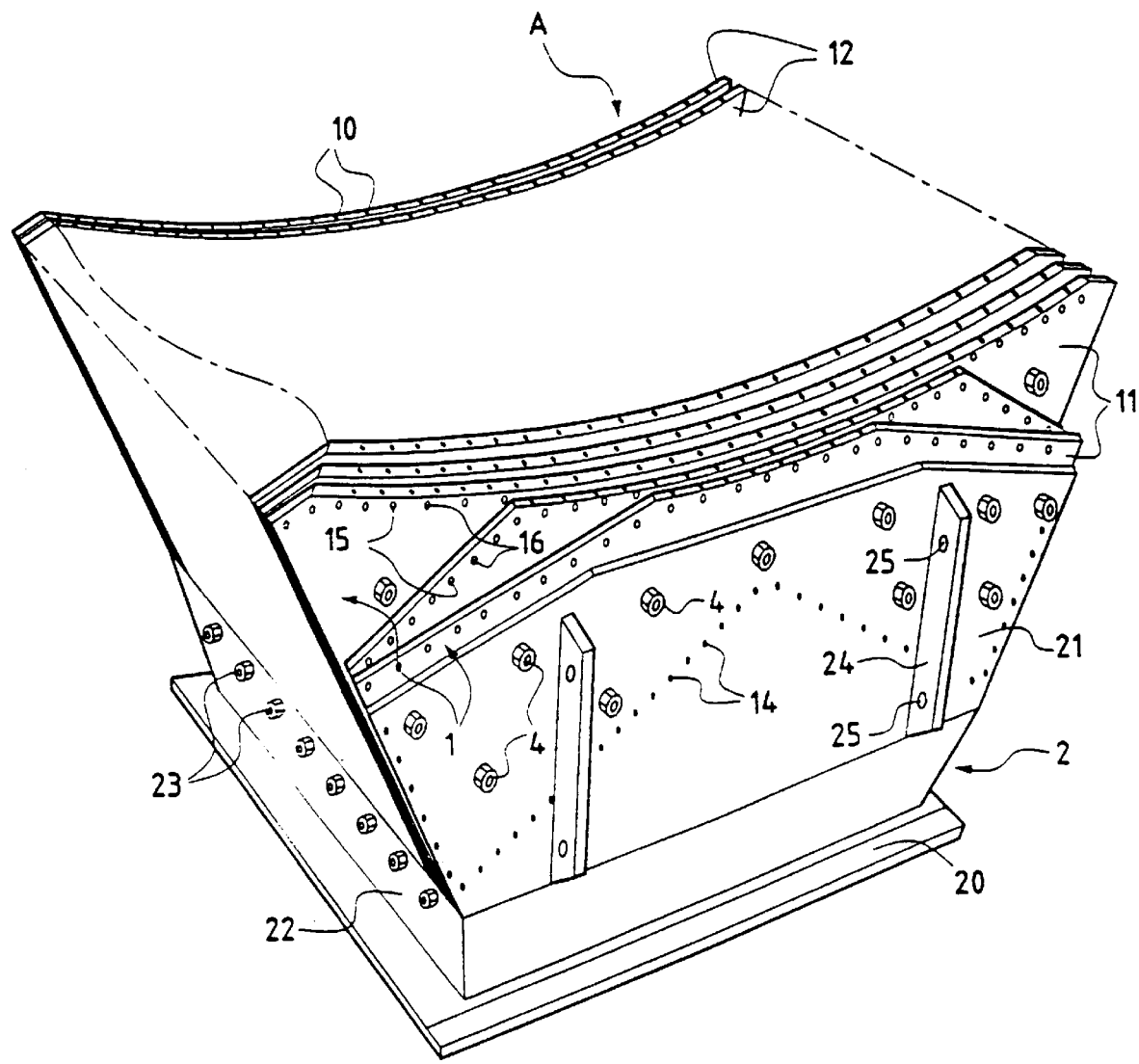
FIG. 3 is a perspective view at a different angle of the lower element of FIG. 2, ☐

The device for cooling, for example tempering glass volumes, illustrated by the figures, comprises two chests A, B, one upper and one lower respectively, disposed opposite each other, each equipped with nozzles 1 having an outlet face provided with holes 10 through which there is blown air or another appropriate cooling gas introduced into the nozzle via an inlet port.

For each chest, the outlet faces defining a blowing surface having a form matching approximately the curvature of the volume to be tempered, such as a plate, and the respective blowing surfaces of the two chests disposed opposite each other, define therebetween a cooling space for insertion of the plate.

Each chest A, B is provided with a feed box 2, which is a sufficiently rigid sheet-metal support that it is possible to minimize the thickness of the metal sheets comprising the nozzles, made by mechanical and welded joints, ensuring communication between a cooling-gas supply loop and the nozzles.

The feed box is provided with a base plate 20, on one side of which there are welded two side panels 21 disposed opposite each other at a distance depending on the dimensions of the plates to be tempered and two faces 22 connecting these two panels at the ends thereof, also opposite each other at a distance depending on the dimensions of the plates. The base plate is perforated in its region bounded between the panels and the faces by a hole, which can be circular, for example, extending as close as possible to these panels and these faces and comprising the cooling-gas inlet of the chest.

For each chest A, B, nozzles 1 are assembled so as to comprise an assembly which can be interchangeable fixed to support 2, the nozzles being disposed in succession from one panel 21 to the other and each extending from one face 22 to the other while projecting beyond the support on the side of their blowing outlet.

Each nozzle 1 comprises two flanges 11, for example of folded galvanized steel sheet, and a strap 12 perforated with holes 10 to comprise the outlet face of the nozzle, inserted between the two flanges along at least one edge segment thereof.

Each flange 11 of a nozzle 1 is fixed to the other flange 11 of the same nozzle by the fact that it is provided with tabs 13 integral therewith (FIG. 4), folded at right angles toward this other flange, which is provided facing these tabs with tabs 13 folded at right angles toward the first flange, these tabs extending along the edges of the flanges joining the outlet face with the inlet port, and corresponding tabs 13 of the two flanges being mutually superposed or fixed by means of blind rivets 14 with interposition of a sealing cement (riveted and bonded fixation).

Straps 12 in this case are made of lightweight metal or alloy sheet whose thickness determines the width of the nozzles: their profile, as already mentioned, matches the curvature of the plate to be treated and that of the edge of the flanges to which they are fixed, and their height is approximately constant.

Figure 4:
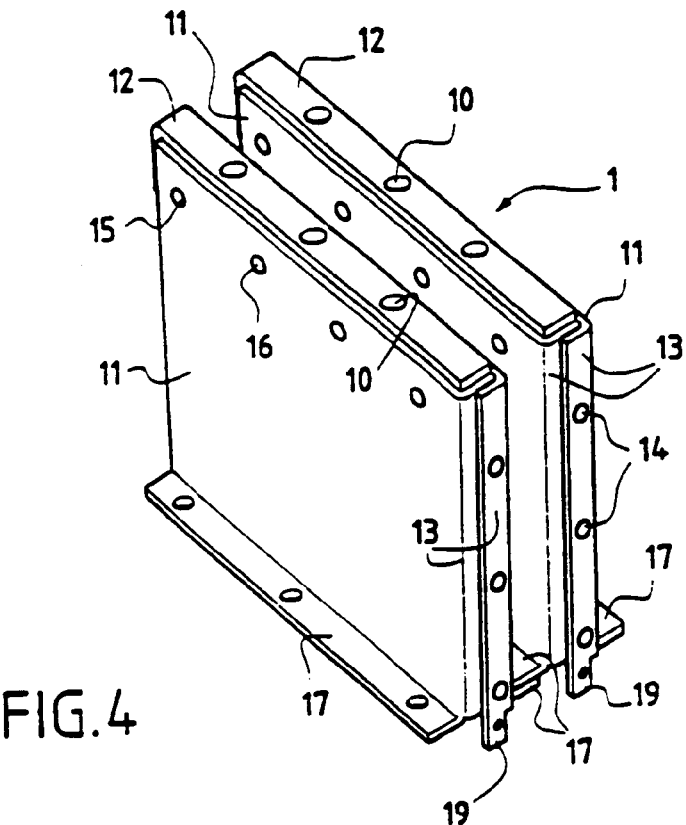
FIGS. 4 and 5 are perspective views of details of mounting of members belonging to the elements of FIGS. 1 and 2.

In each nozzle 1, strap 12 is fixed to flanges 11 by an assembly of rivet 15 and locking rivet 16 traversing it as well as the flanges from one side to the other, the head of the rivet and that of the locking rivet bearing on the respective outside surfaces of the two flanges. The holes in the flanges and in the strap can have different diameters depending on whether they are designed to accommodate a rivet or a locking rivet: it is possible to provide that, for neighboring fixation holes, the position of rivet 15 and that of locking rivet 16 are inverted (FIG. 4).

Each flange 11 of a nozzle 1 disposed opposite a flange of a neighboring nozzle is fixed thereto by the fact that it is also provided with tabs 17 integral therewith, folded at right angles toward the outside of the nozzle along its edge defining inlet port 18 of the nozzle, and that the tabs facing the flanges of neighboring nozzles are also mutually superposed and fixed by means of blind rivets 14 (FIG. 5) with interposition of a sealing cement (also riveted and bonded fixation).

Figure 5:
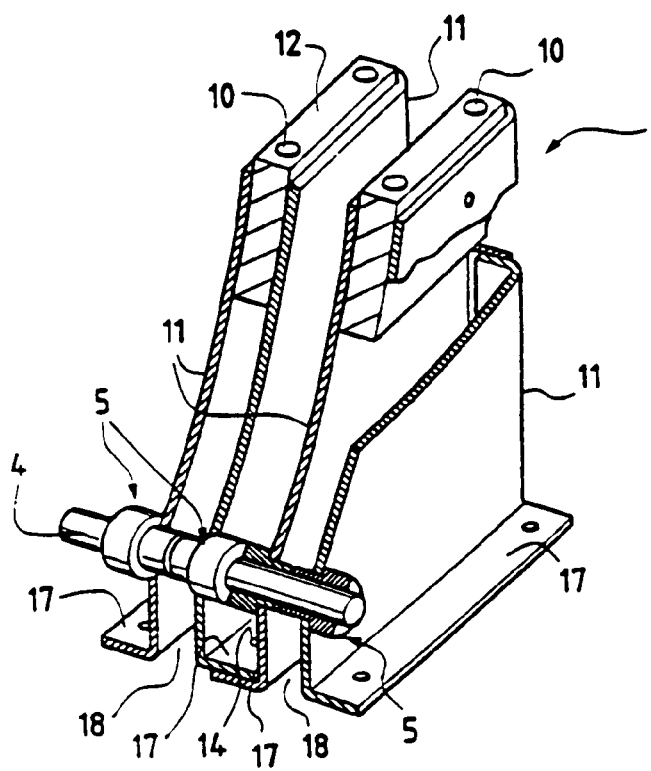

The assembly of nozzles is fixed to side panels 21 of support 2 by tie rods 4, which traverse it as well as the side panels of the support from one side to the other, the threaded ends of which receive a nut and jam nut with interposition of a washer against the panel. In order to minimize deformation of flanges 11 and especially spreading apart thereof during the operation of assembly of the chest and during pressurization/depressurization during the working process, the space between the nozzles is braced. For this purpose, the holes in the flanges for accommodating tie rods 4 have a diameter greater than that of said tie rods, and braces 5 in abutting relationship are slipped over the tie rod; these braces have a shoulder, and the immediately neighboring braces slipped over each tie rod are disposed symmetrically relative to each other in such a way that their respective shoulders comprise bearing surfaces for the surfaces, exterior to the nozzle, of two facing flanges comprising a given nozzle (FIG. 5). The number of tie rods is reduced by virtue of the rigidity of the feed box; by virtue of the smaller number, it is easier to maintain the spaces between the nozzles.

In addition, the flanges of the end nozzles opposite the side panels are applied thereagainst and are also fixed thereto by rivets such as blind rivets 14.

Furthermore, at least some flanges are provided with an additional fixation lug 19 extending toward the inlet of the feed box and prolonging either a tab 17 of their inlet edge or a tab 13 of an edge joining the inlet edge to the outlet edge, this lug 19 being applied against a face 22 of the feed box and pinched between it and a finger carried by a nut in which there is threaded a screw 23 traversing face 22 (FIGS. 1 to 4), possibly by the intermediary of a strap running internally along this face.

The tempering device is also provided with at least one blowing rail 6 fixed preferably to a nozzle which is closest to a side panel of one of chests A, B, on the outside thereof and extending along this nozzle, close to the cooling surface. Preferably it is provided on both sides thereof with two such blowing rails 6, carried by upper chest B. Rails 6 also protect the tempering nozzles from potential impacts.

In view of their handling by a suspension conveyor, chests A, B are provided with ribs 24 carried by side panels 21, projecting toward the outside and having clevis-type eyelets 25 for a cable supported by a suspension member of the conveyor.

In common with the known devices, therefore, the device according to the invention is provided with an upper chest B and a lower chest A as well as at least one blowing rail 6, and in common therewith its primary purpose is to ensure cooling, in this case tempering, while guiding the air stream on the basis of well-defined flowrate and velocity characteristics. With the device according to the invention, however, this purpose is met with all the precision required by the glass plates of small thickness now being used, especially in the automobile industry, using lower and upper chests which are identical in their design and construction if not their geometry, one having a generally concave strap curvature and the other a generally convex strap curvature, with the possibility of tempering plates having a very complex profile.

It is possible, for example, that some nozzles 1 have forms different from those of others, especially those which are closest to the side panels 21 of the feed box, in order to match the contour of the plate as closely as possible. In certain cases, the ends of such nozzles are truncated, the region of their strap 12 perforated with blow holes 10 being shorter than that of the neighboring nozzle, and so on toward the middle of the chest. In this case, certain tie rods 4, which do not reach the panels of the feed box, are shorter than the others. Nevertheless, the number of such tie rods of different lengths remains small, and it is no less true that a large number of the parts used are identical, whether they be tie rods 4, braces 5 or rivets 14, 15 and locking rivets 16.

In a practical example given by way of indication, faces 22 of feed boxes 2 are welded to base plate 20 in such a manner that they diverge toward the tempering space, while side panels 21 are welded to this plate in such a manner that they diverge or even converge at first, but are prolonged beyond the end of the faces in such a manner that they become parallel to each other and perpendicular to the base plate, in such a way that nozzles 1 are disposed in a succession in which they are parallel to each other from one side panel to the other. The nozzles also flare toward the tempering space. For reasons of light weight and economy of material, the inlet edge of the nozzles can be cut in the form of a V (nozzles of the upper chest) or an inverted V (nozzles of the lower chest). It may then be useful or even necessary to make the central region of the chest more rigid by means of one or more sheet-metal partitions extending from the base plate perpendicular thereto from one panel to the other.

It is fully understood, however, that the invention is not limited to these embodiments and that others can be provided without going beyond the scope of the invention.

What is claimed is:

1. A chest for cooling and tempering glass plates, said chest comprising nozzles forming a blowing zone, and a rigid support associated with at least one panel on which the nozzles are fixed, wherein each nozzle comprises two flanges having peripheral sides, a top, and a bottom and a strap perforated with blow holes, each of the flanges are of one-piece construction, and are provided with tabs located on the peripheral sides, the peripheral side tabs are folded toward and overlappingly engage the neighboring peripheral side tabs on the neighboring flange, and the flanges are fixed to each other along the peripheral sides and the strap is fixed to the top of the flanges by riveting and/or interposition of a cement thereby forming a nozzle, the bottom of the flanges connect the nozzles to the rigid support to form the chest.

2. A chest according to claim 1, characterized in that it is provided with at least one tie rod traversing the nozzles and the panel.

3. A chest according to claim 2, characterized in that braces are slipped over the tie rod.

4. A chest according to claim 1, characterized in that it is provided with:
    said at least one panel comprising at least two panels and two faces connecting these panels,
    said nozzles forming an assembly of nozzles disposed in succession from one panel to the other and extending from one face to the other while projecting beyond the support toward a cooling space, each said flange being provided with bottom tabs integral therewith, folded at right angles toward the neighboring flanges, at least some bottom tabs being superposed and fixed together by rivets and interposition of a cement,
    tie rods for fixation of the assembly of nozzles to the support, traversing this assembly and the panels, and braces slipped thereover and provided between the neighboring flanges belonging to two neighboring nozzles with a surface which limits the deformation of the flanges.

5. A chest according to claim 1, characterized in that the strap is fixed to the flanges by assemblies of rivets and locking rivets traversing it as well as the flanges.

6. A chest according to claim 1, characterized in that some flanges are provided with a lug prolonging said peripheral side tabs for fixation of the flanges to each other, and this lug is applied against a face of the support and is fixed thereto.

7. A chest according to claim 1, characterized in that said nozzles are also fixed to the support by blind rivets which fix the closest nozzle to the at least one panel.

8. A chest according to claim 4, characterized in that the braces each have a shoulder, and the shoulders disposed opposite each other and belonging to two neighboring braces comprise bearing surfaces for the facing flanges comprising a given nozzle.

9. A chest according to claim 1, characterized in that the support is an assembly of mechanically joined and welded metal sheets.

10. A chest according to claim 1, characterized in that the flanges are of sheet metal.

11. A chest according to claim 1, characterized in that the straps are of lightweight metal or alloy.

12. A chest according to claim 1, characterized in that said chest carries on the outside at least one blowing rail extending along a nozzle close to said at least one panel and a cooling space.

13. The use of chests according to claim 1, to form a cooling device containing at least two chests comprising two blowing surfaces disposed opposite each other and defining therebetween a cooling space.

14. A cooling device according to claim 13 containing two chests, one lower and the other upper respectively, characterized in that the upper chest carries on its outside two blowing rails on the two sides thereof.

15. A chest according to claim 2, characterized in that it is provided with:
    said at least one panel comprising at least two panels and two faces connecting these panels,
    said nozzles forming an assembly of nozzles disposed in succession from one panel to the other and extending from one face to the other while projecting beyond the support toward a cooling space, each said flange being provided with bottom tabs integral therewith, folded at right angles toward the neighboring flanges, at least some bottom tabs being superimposed and fixed together by rivets and interposition of a cement,
    tie rods for fixation of the assembly of nozzles to the support, traversing this assembly and the panels, and braces slipped thereover and provided between the neighboring flanges belonging to two neighboring nozzles with a surface which limits the deformation of the flanges.

16. A chest according to claim 3, characterized in that it is provided with:
    said at least one panel comprising at least two panels and two faces connecting these panels,
    said nozzles forming an assembly of nozzles disposed in succession from one panel to the other and extending from one face to the other while projecting beyond the support toward a cooling space, each said flange being provided with bottom tabs integral therewith, folded at right angles toward the neighboring flanges, at least some bottom tabs being superimposed and fixed together by rivets and interposition of a cement,
    tie rods for fixation of the assembly of nozzles to the support, traversing this assembly and the panels, and braces slipped thereover and provided between the neighboring flanges belonging to two neighboring nozzles with a surface which limits the deformation of the flanges.

17. A chest according to claim 2, characterized in that the strap is fixed to the flanges by assemblies of rivets and locking rivets traversing it as well as the flanges.

18. A chest according to claim 3, characterized in that the strap is fixed to the flanges by assemblies of rivets and locking rivets traversing it as well as the flanges.

19. A chest according to claim 4, characterized in that the strap is fixed to the flanges by assemblies of rivets and locking rivets traversing it as well as the flanges.

20. A chest according to claim 2, characterized in that some flanges are provided with a lug prolonging said peripheral side tabs for fixation of the flanges to each other, and this lug is applied against a face of the support and is fixed thereto.

21. A chest for cooling and tempering glass plates, said chest comprising:

a rigid support associated with at least one panel, said rigid support having an opening;

nozzles each comprising two flanges joined along peripheral sides and having an inlet port and an outlet face forming a blowing zone, said nozzles are fixed on said rigid support such that said inlet port of each of said nozzles is fluidly connected to said opening of said rigid support, said outlet face of each of said nozzles including a strap perforated with blow holes attached to said two flanges; and at least one tie rod extending through said nozzles and said at least one panel, wherein said at least one tie rod interconnects said nozzles and said at least one panel to provide a rigid structure.

* * * * *